(No Model.)

2 Sheets—Sheet 1.

G. F. GREEN.
ELECTRIC BATTERY.

No. 306,684. Patented Oct. 14, 1884.

Attest:
J. A. Dinwiddie
Warren Cushman

George F. Green,
Inventor.
by Henry Millward,
Attorney.

N. PETERS. Photo-Lithographer. Washington, D. C.

(No Model.) 2 Sheets—Sheet 2.
G. F. GREEN.
ELECTRIC BATTERY.
No. 306,684. Patented Oct. 14, 1884.
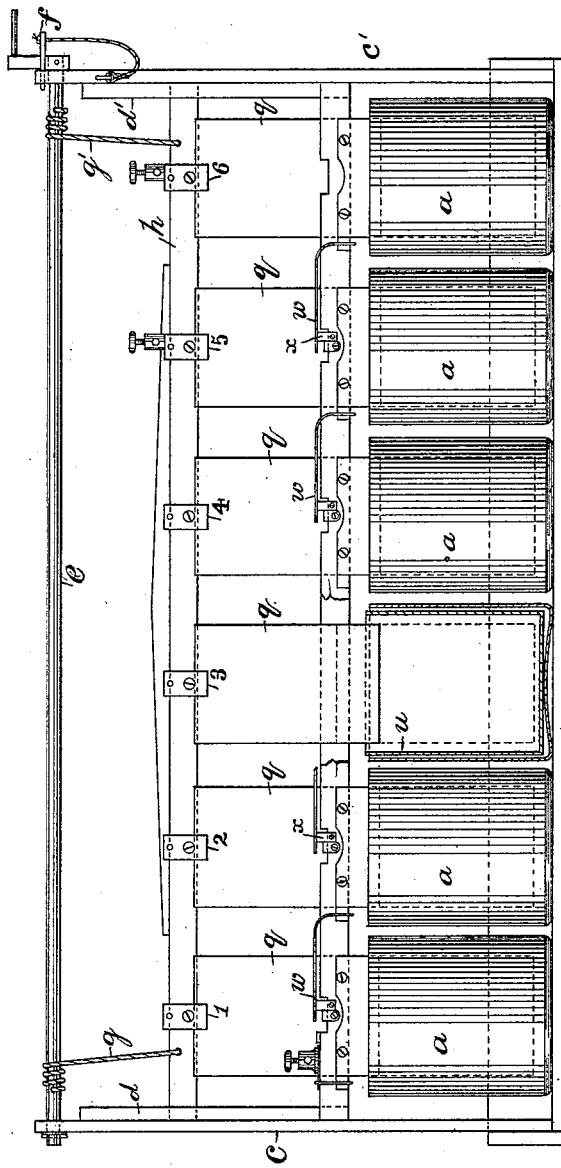
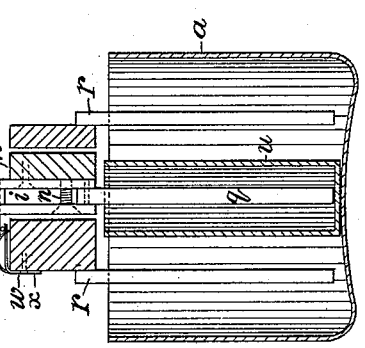
Fig. 3.
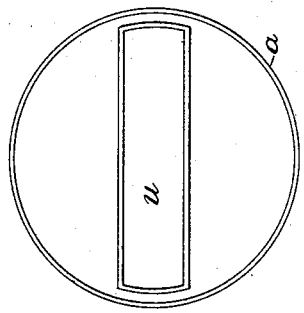
Fig. 5.
Fig. 4.
Attest:
J. A. Dinwiddie
Warren Cushman
Inventor.
George F. Green
by
Henry Millward,
attorney.
N. PETERS, Photo-Lithographer, Washington, D. C.

UNITED STATES PATENT OFFICE.

GEORGE F. GREEN, OF KALAMAZOO, MICHIGAN, ASSIGNOR TO HIMSELF, OLIVER S. KELLY, AND SOL. J. HOUCK, OF SPRINGFIELD, OHIO.

ELECTRIC BATTERY.

SPECIFICATION forming part of Letters Patent No. 306,684, dated October 14, 1884.

Application filed September 14, 1883. (No model.)

*To all whom it may concern:*

Be it known that I, GEORGE F. GREEN, of Kalamazoo, county of Kalamazoo, State of Michigan, have invented a new and useful Improvement in Electric Batteries, of which the following is a specification.

Figure 1:
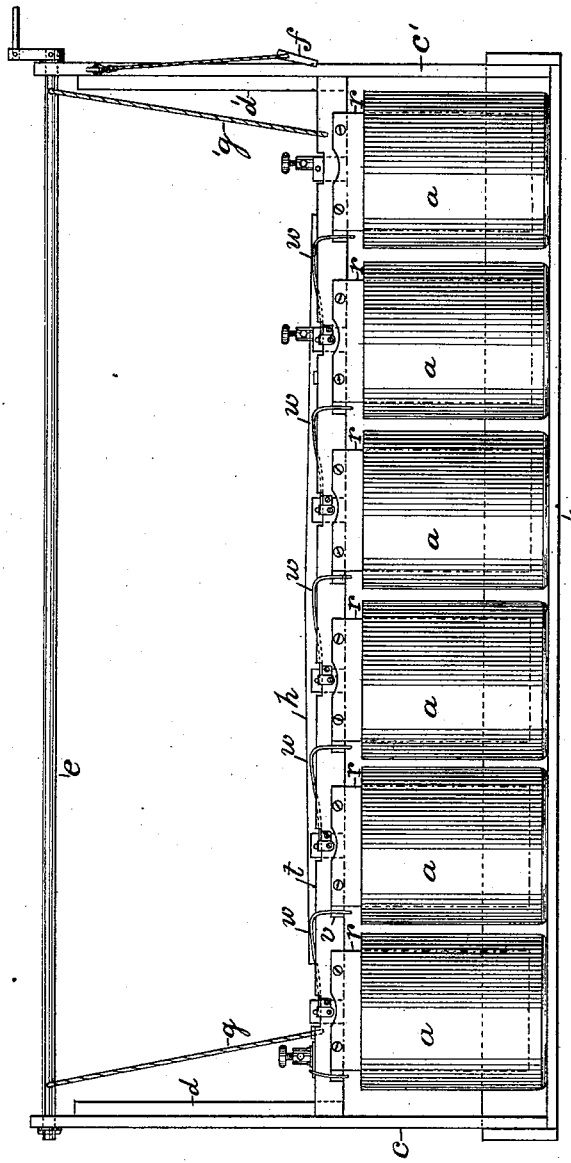
Figure 2:
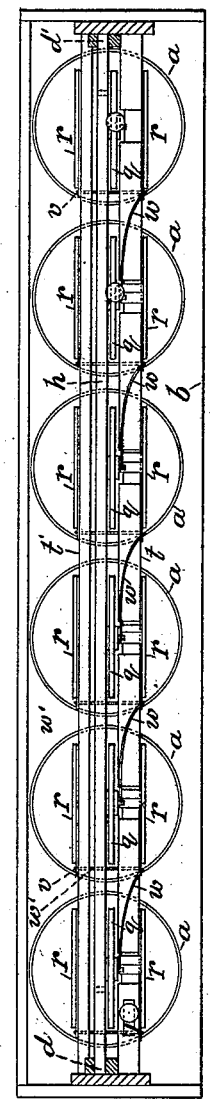

In the accompanying drawings, Figure 1 is a longitudinal elevation of a battery of my invention, with the battery illustrated in position for use. Fig. 2 is a plan of the same. Fig. 3 is a longitudinal elevation of the same, with the battery illustrated in the position it occupies when out of use, and one of the jars shown in section for purposes of perspicuity. Fig. 4 is a cross-section illustrative of the clamping device for holding the zinc plates to the longitudinal cross-bar to which they are all suspended. Fig. 5 is a plan view of one of the jars; and Fig. 6 is a transverse section through the same, including the zinc and carbon plates and the aforesaid cross-bar and clamps.

In each of these figures letters of like character indicate corresponding parts.

The invention has for its object improvement in the construction of electric batteries for the purpose of being more easily handled and at the same time more effective, as, by an easy method of raising the zinc plates from the jars when the battery is not in use, I provide a ready means whereby local action of the battery can be stopped, thereby causing said battery to retain its energy until needed for future use, thus lengthening the life of the battery by allowing it to remain at rest when not in actual use.

The invention consists, chiefly, in a mechanism for establishing automatic metallic connection between the battery and circuit-wires when the battery is arranged for use, and an automatic severance of said connection when the battery is arranged for disuse.

It further consists in a clamping device, hereinafter fully described, to connect the zinc plates to a longitudinal cross-bar, to which all of said plates are attached, whereby the aforesaid plates are securely held by said cross-bar, and may be readily reversed in order that the end that has become exhausted may be replaced by the end that has been in the clamping device, thus furnishing ready means for the transportation of parts, and for obtaining the full benefit of the zinc plates.

It further consists in a means for preventing oxidization by contact with the acids of the bath of the metallic pieces used to secure the carbons to the aforesaid cross-bar, as will hereinafter be fully specified.

It also consists in combinations and arrangements of parts, as will hereinafter be fully specified, and pointed out in claims.

In order that others skilled in the art to which my invention belongs may be able to make and use the same, I will proceed to describe its construction and operation.

The jars $a$ are arranged in line in the usual manner, and rest upon a base, $b$, of a main frame, constructed with uprights $c$ $c'$, having grooves $d$ $d'$, a winding-drum, $e$, and means, $f$, for holding said drum to any adjustment, and ropes $g$ $g'$, that attach to the cross-bar $h$. The ends of the cross-bar $h$ work in the grooves $d$ $d'$, and the clamps 1, 2, 3, 4, 5, and 6 (for which see Fig. 3 of drawings) are secured to the cross-bar $h$ by means of machine-screws that pass through the perforations $i$, (for which see Figs. 4 and 6 of drawings.) The clamps 1 to 6, inclusive, are drawn to an enlarged scale in Figs. 4 and 6 of the drawings, and each of them is constructed with a metallic plate, $l$, that is secured to the cross-bar $h$, a pin and distance-piece, $m$ $m'$, a clamping-screw, $n$, a stud, $o$, and a plate, $p$. The plate $p$ slides with an easy fit over the pin $m'$, and the stud $o$ fits into a perforation formed in the zinc plate $q$. The stud $o$ serves to prevent the zinc plate from sliding through the clamp, and the clamping-screw $n$ and plate $p$ serve to keep the zinc in its designed position. The carbon plates $r$ are secured to the two rigid cross-bars $t$ $t'$ by means of machine-screws, as shown, and these cross-bars are firmly secured to the uprights $c$ $c'$. In the interior of the jars $a$ are located the porous cells $u$.

Before using these carbon plates I saturate them at their upper ends in a bath of paraffine or some other material that is capable of resisting the action of acids. I do this to prevent the action of the acids upon the metallic means that is used to secure these plates to the cross-bars, and thereby obviate oxidation of said metallic plates. By saturating the carbons with paraffine the paraffine will close the pores in the body of the carbons as well as on the outside, so that capillary attraction is prevented at the upper ends of the carbons. At the same time the outside surface of the carbons is free from paraffine, which enters only the pores, so that the metallic clamps may close tight against the carbons, thereby making good clean connection between the carbons and metallic clamps to conduct the current. It will be understood that after the paraffine has saturated the carbons the surplus is wiped from off the carbons. Each of the carbons is set against a strip of copper, $v$, to which the circuit-wires $w$ are soldered. As two carbon plates are used to each jar, I connect them by means of a wire, $w$, that runs underneath the cross-bars $t\ t'$, and are then soldered to the copper strips $v$. Each of the circuit-wires $w\ w'$ extends from the aforesaid copper strips to a point above the cross-bars $t\ t'$, and at their extremities they are provided with a spring-plate, $x$, that extends from them at an angle that approaches a right angle, and is then bent down and secured to the cross-bar $t$. I also employ an independent auxiliary spring, $y$, that works in harmony with them, for the purpose of assisting in making metallic connection with the circuit. The pin $m'$ of each of the clamps comes in contact with the ends of the wires $w$ when the zinc plates are lowered for use, and thus a metallic connection between the carbon and zinc plates of alternate cells is attained; but when the zinc plates are raised by the means shown this connection is immediately severed. The wires $w$ continue until they connect with the pole $z$.

In preparing the battery for action the zinc plates are first coated with quicksilver. The inside or porous cell is then supplied with water, and the jars with a solution of sulphuric acid and bichromate of potash, the water used in this solution being sufficient to bring the fluids in both vessels to a common level.

Having thus described my invention, what I claim as new, and desire to secure by Letters Patent, is—

1. In an electric battery, a zinc plate suspended by a pin from between clamping-plates, in combination with a distance-piece between said plates, and means for clamping said plates to said parts, substantially as described.

2. In an electric battery, the combination of a series of cells, means for suspending the zinc plates of each cell from an elevating and lowering device, and metallic pins projecting from the suspension means, adapted to be brought into contact with wires from the carbons of the adjoining cells, whereby the circuit is broken when the zincs are elevated and connected when they are lowered, substantially as described.

In testimony whereof I have hereunto set my hand this 24th day of August, 1883.

GEORGE F. GREEN.

Witnesses:
HENRY MILLWARD,
G. V. FRY.